Oct. 23, 1962 C. H. NICKELL ETAL 3,059,730
DISC BRAKE
Filed Feb. 10, 1958 6 Sheets-Sheet 1
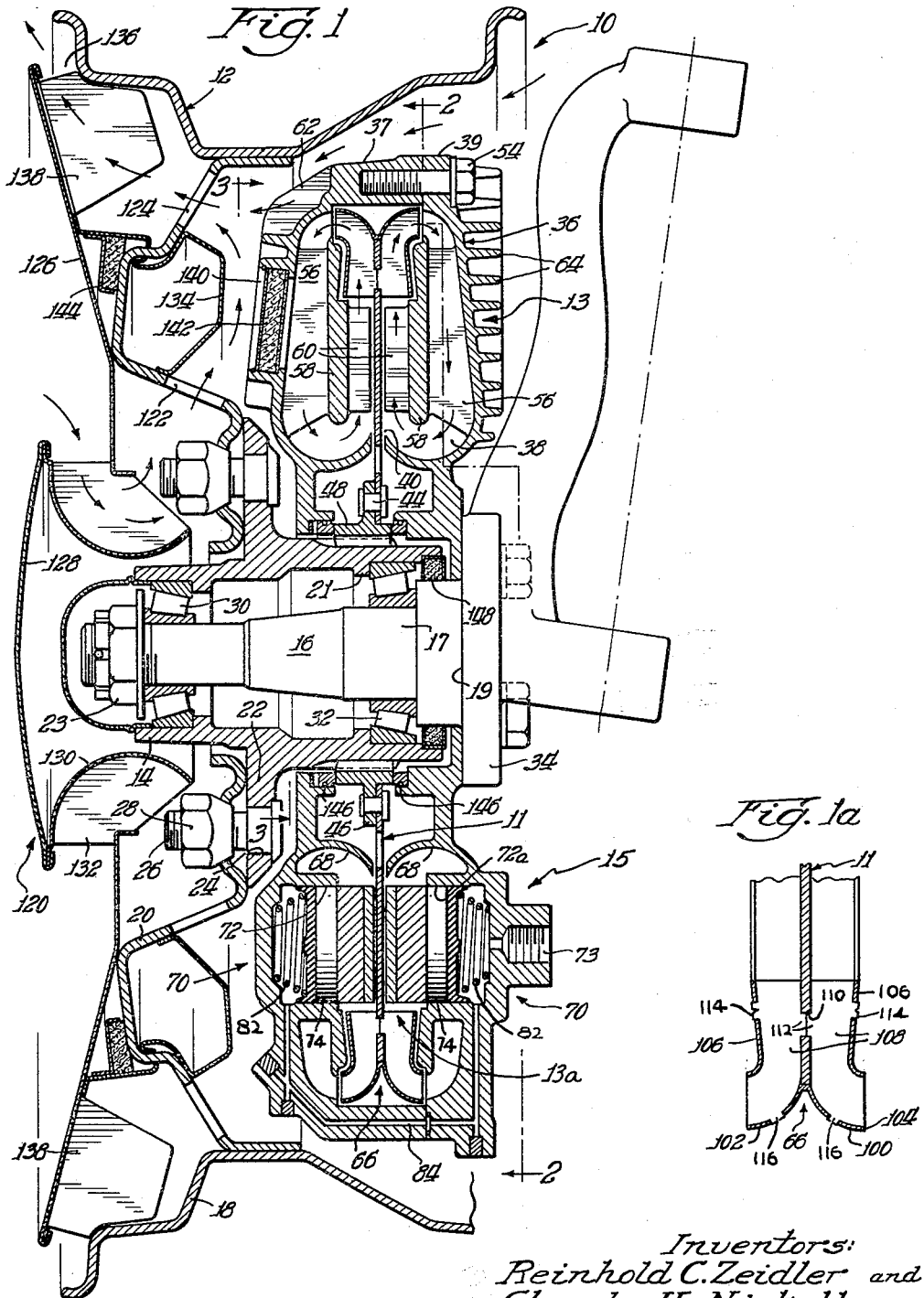
Inventors:
Reinhold C. Zeidler and
Claude H. Nickell
By: Francis T. Drumm Atty.

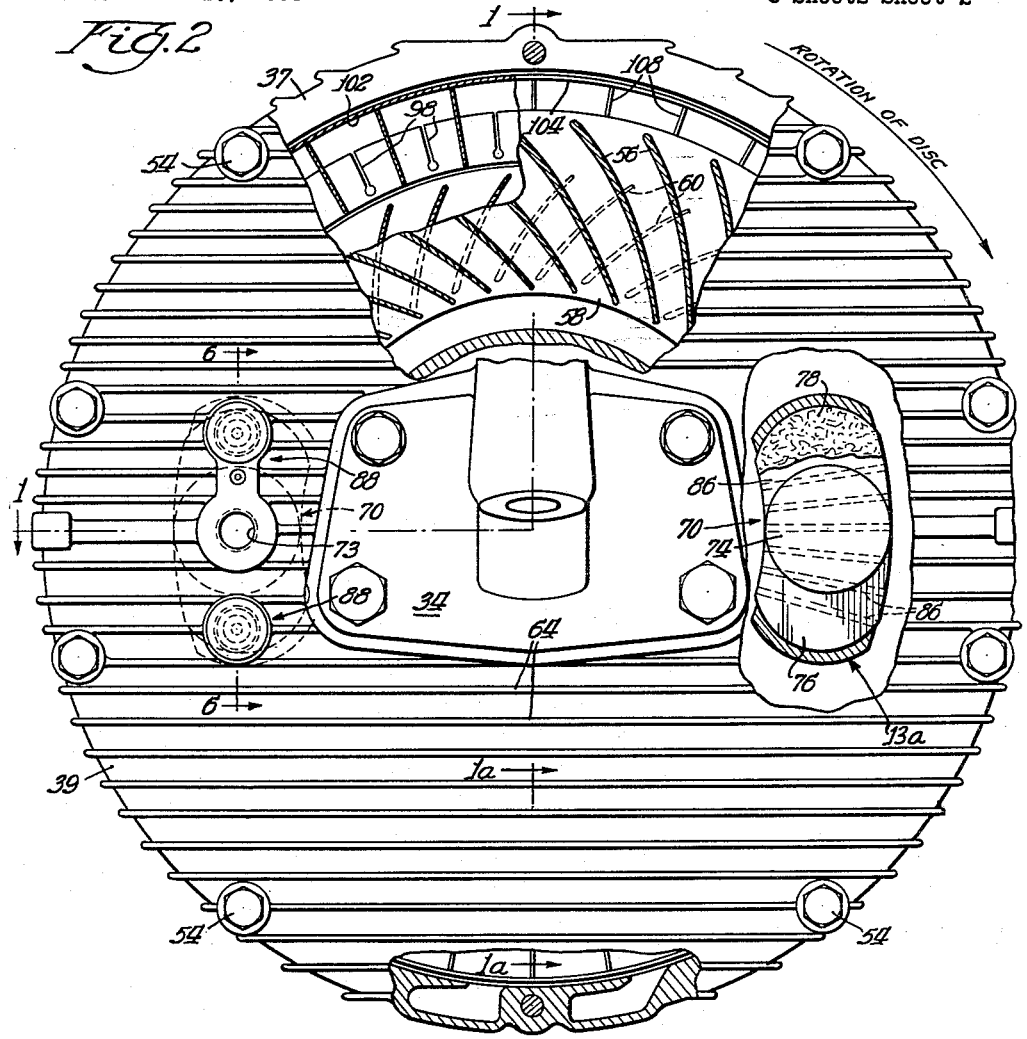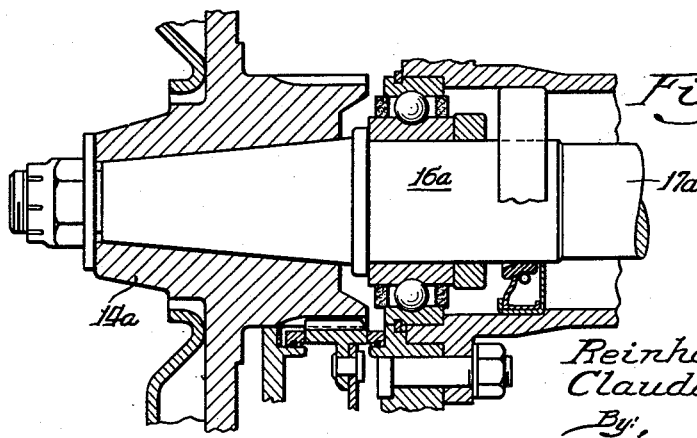

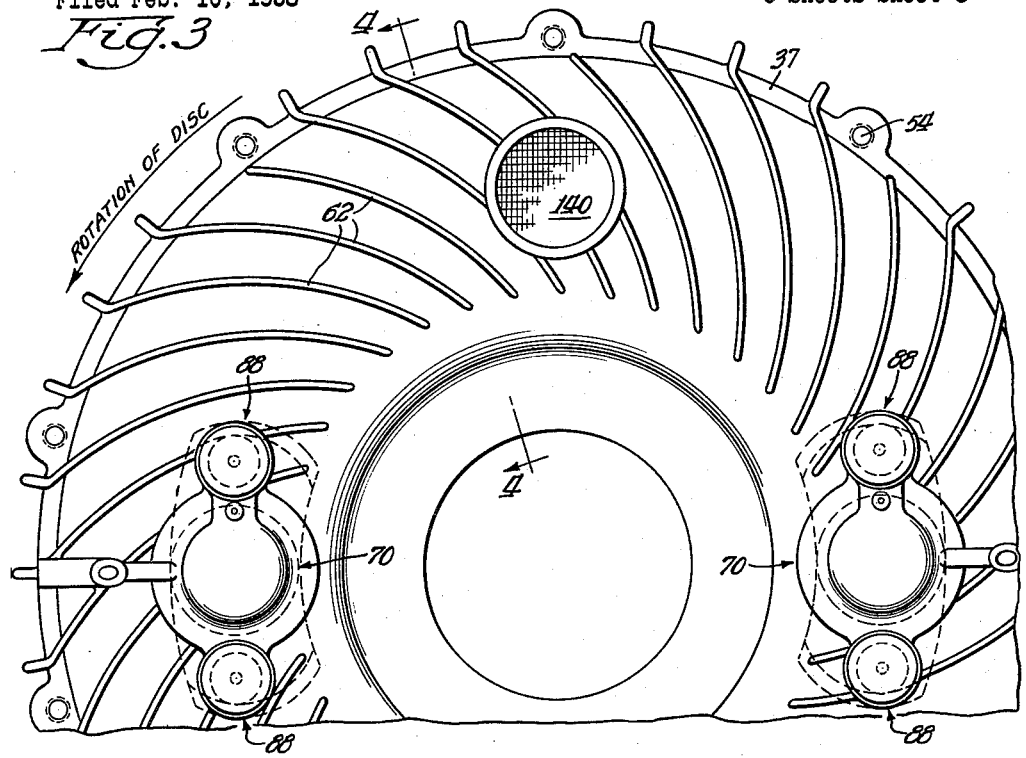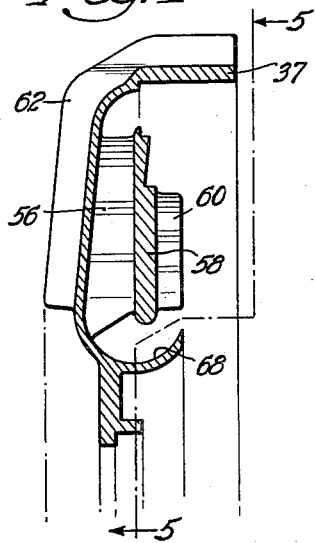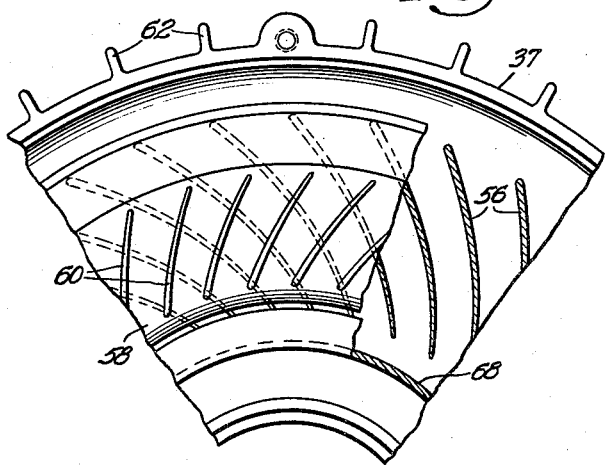

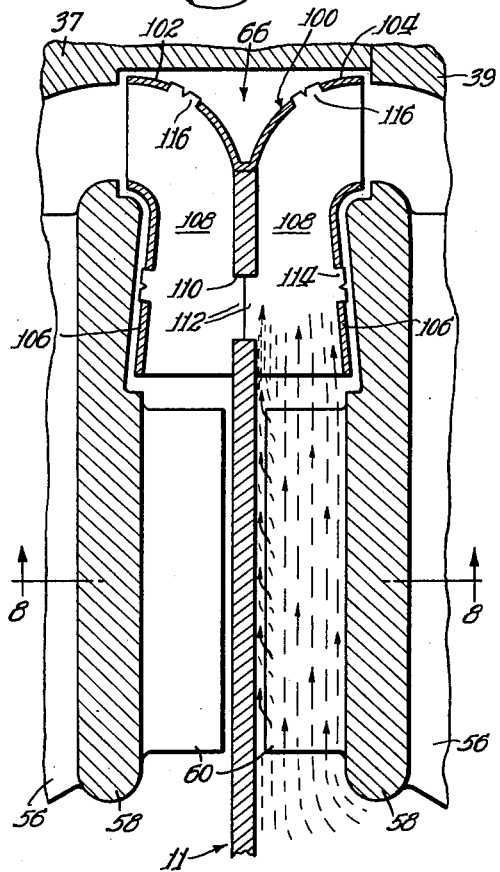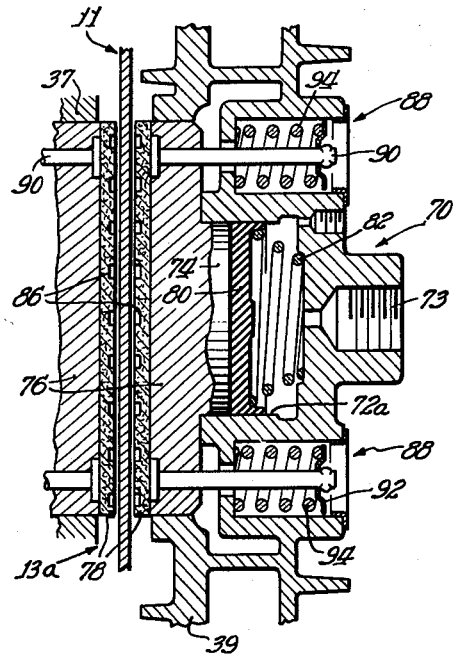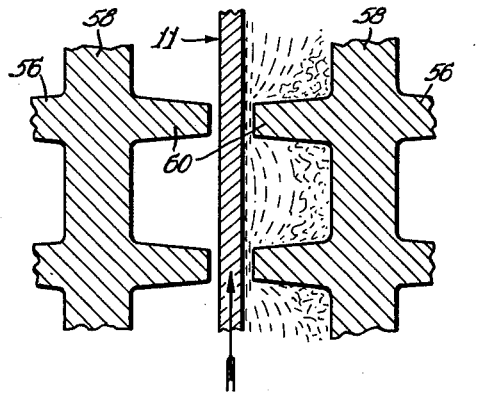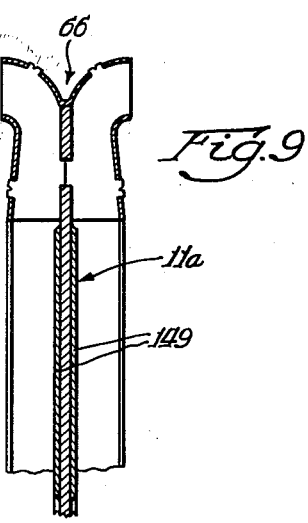
Inventors:
Reinhold C. Zeidler and
Claude H. Nickell
By Francis T. Drumm
Atty

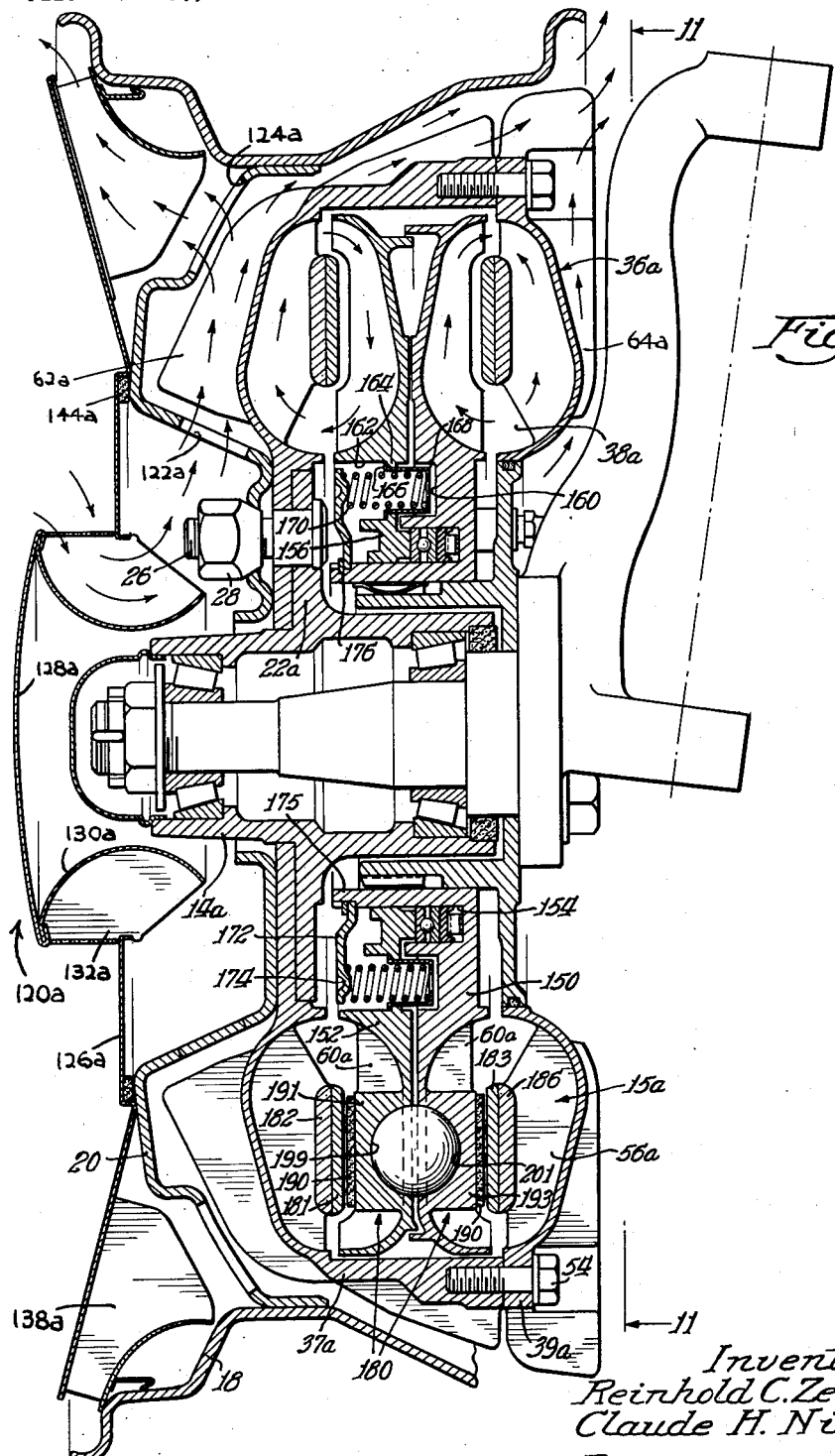

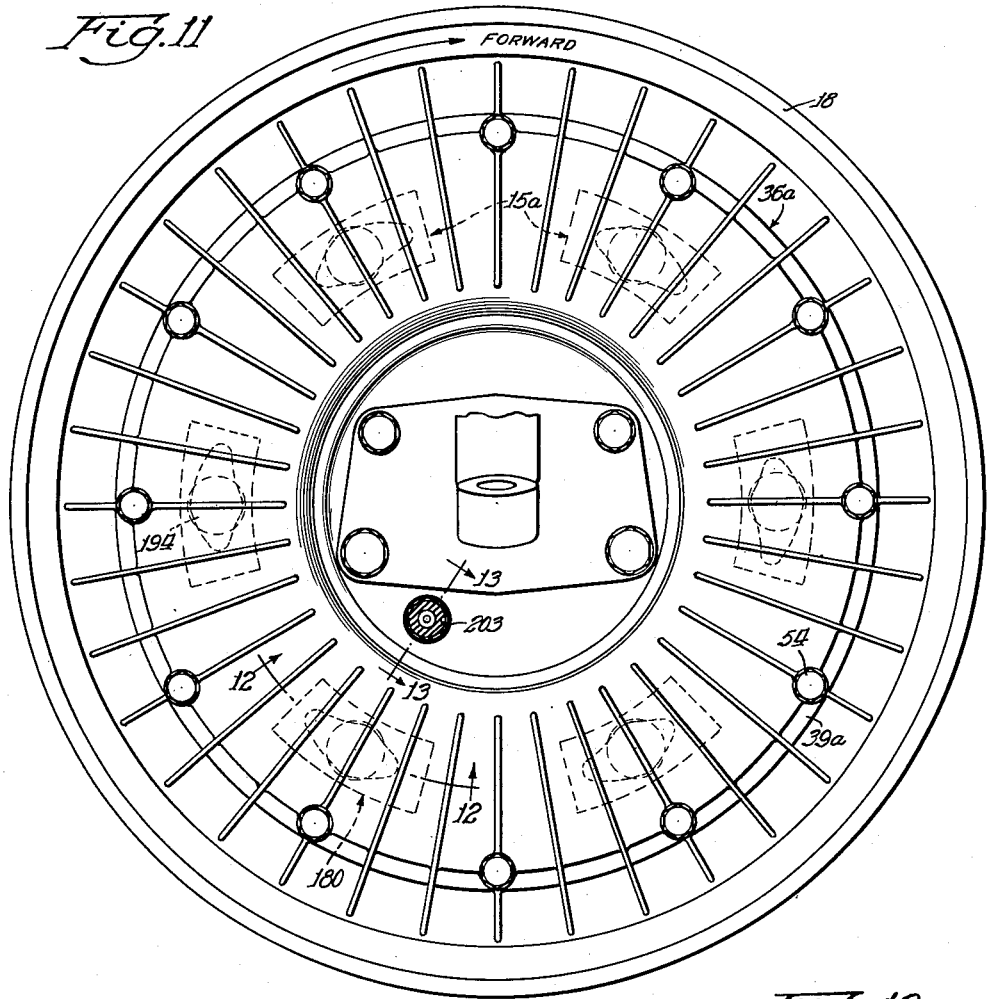

United States Patent Office 3,059,730
Patented Oct. 23, 1962

3,059,730
DISC BRAKE
Claude H. Nickell, Dearborn, and Reinhold C. Zeidler,
Detroit, Mich., assignors to Borg-Warner Corporation,
a corporation of Illinois
Filed Feb. 10, 1958, Ser. No. 714,265
4 Claims. (Cl. 188—72)

This invention relates to vehicle brakes and more particularly to a vehicle brake of the disc type.

Heretofore, difficulty has been experienced in manufacturing a vehicle brake capable of effectively stopping a vehicle under severe conditions of use, such as when the brakes are applied repeatedly within a short period of time. A principal cause of failure of brakes has been the quantity of heat generated in the areas of frictional contact. The temperature at the friction linings commonly runs as high as 1000° F. to 1800° F. Brake linings which function adequately at 600° F. burn out consistently at the higher temperatures commonly experienced in braking present day vehicles. Because of the substantial increase in horsepower of modern motor vehicles, speeds have been increased, and, consequently, the heat generated by braking has increased correspondingly. In addition, wheel diameters have been decreased with result that effective frictional braking area is decreased. The present basic requirement for safe operation of motor vehicles at high speeds is that a braking system be capable of stopping a vehicle repeatedly from 100 m.p.h. A 4000 pound automobile operating at 100 m.p.h. develops approximately 1,300,000 foot pounds of kinetic energy. This energy, when converted to heat by friction, must be dissipated rapidly else melting of the frictional surfaces occurs. Attempts have been made in the past to obviate the inherent disadvantages of the drum type brake conventionally employed in motor vehicles. These attempts have included the use of disc brakes in which small friction buttons or segments are brought to bear against a disc attached to a wheel. This type of brake has given good results since the disc provided a maximum of swept area. One disadvantage of this type of brake, however, was that the disc commonly rotated in the open and was consequently exposed to contamination by road dust, water, road tar and the like which impaired is efficiency.

A primary object of the invention is, therefore, to provide a vehicle brake of the stated type in which means are provided for efficiently and effectively cooling the brake without incurring contamination of the friction surfaces by road dust, water, road tar and the like.

Another object of the invention is to provide a vehicle brake of the disc type in which the areas of frictional contact are isolated from exposure to the elements and in which the heat generated by contact of the frictional elements is dissipated by a secondary heat exchange system.

Another object of the invention is to provide a disc brake of the type described in which the frictional area is surrounded by an enclosure and in which the enclosure is cooled by air from the slip stream of the vehicle.

A further object of the invention is to provide a vehicle brake of the mentioned character in which means are provided for effecting turbulence in the immediate vicinity of the rotating disc and in which the frictional heat is dissipated both by conduction and convection.

A further object of the invention is to provide a vehicle brake of the stated type in which means are provided for inducing a circulation of air at the surfaces of the rotating disc to prevent the formation of a stagnant insulating film of air and in which the means utilized to effect this circulation is capable also of conducting heat away from the areas of frictional contact to be dissipated by a secondary air stream.

Another object of the invention is to provide a vehicle brake cooling system wherein air from the slip stream passing over the outer edge of the rim of the vehicle wheel is directed axially inwardly for dissipation of heat from the areas of frictional contact.

A further object of the invention is to provide a vehicle brake of the stated type wherein the areas of frictional contact are enclosed to form a closed chamber, wherein means are provided to effect turbulence in the air within the closed chamber and wherein air in the slip stream flowing past the outer edge of the vehicle wheel rim is directed axially inwardly and thence radially outwardly into contact with the enclosure forming the chamber to be discharged at the outer edge of the wheel periphery.

A more particular object of the invention is to provide a vehicle brake of the stated character having a rotatable element, a rotatable fixed element, means for selectively effecting relative movement between the rotatable element and the rotatably fixed element so that frictional contact therebetween at predetermined areas is afforded, means positioned in limited spaced relation to the rotatable element for effecting turbulence in the air immediately adjacent thereto, means forming a closed chamber surrounding the contact areas, and means cooperating with the vehicle wheel for directing a flow of air into contact with the means defining the chamber to afford secondary heat exchange.

These and other objects and features of this invention will be apparent from the following description when taken with the accompanying drawings, in which:

FIGURE 1 is an elevational sectional view of a vehicle brake made in accordance with the present invention and is taken substantially on line 1—1 of FIGURE 2;

FIGURE 1a is an elevational sectional view taken substantially on line 1a—1a of FIGURE 2;

FIGURE 2 is an elevational view, partly broken away and partly in section, of the vehicle brake of FIGURE 1, taken substantially on line 2—2 of that figure;

FIGURE 2a is an enlarged fragmentary elevational sectional view of details of the vehicle brake of the present invention as applied to the rear wheel of a vehicle;

FIGURE 3 is a fragmentary elevational view of the chamber enclosure forming a part of the present invention and is taken substantially on line 3—3 of FIGURE 1;

FIGURE 4 is a fragmentary elevational sectional view taken substantially on line 4—4 of FIGURE 3;

FIGURE 5 is a fragmentary elevational sectional view broken away to illustrate the means for effecting turbulence within the enclosed chamber surrounding the contact area and is taken substantially on line 5—5 of FIGURE 4;

FIGURE 6 is an enlarged elevational sectional view of a preferred means for effecting relative movement between the rotatable element and the rotatably fixed element and is taken substantially on line 6—6 of FIGURE 2;

FIGURE 7 is a greatly enlarged elevational sectional view illustrating details of the air circulation within the closed chamber and the relationship of the turbulizer fins to the disc;

FIGURE 8 is a sectional view taken substantially on line 8—8 of FIGURE 7;

FIGURE 9 is a view similar to FIGURE 1a but showing a modified form of the invention utilizing cast iron facings for the areas of frictional contact;

FIGURE 10 is a view similer to FIGURE 1 but showing a vehicle brake made in accordance with a modified form of the present invention;

FIGURE 11 is an elevational view taken substantially on line 11—11 of FIGURE 10;

FIGURE 12 is a cross-sectional view taken substantially on line 12—12 of FIGURE 11; and FIGURE 13 is a cross-sectional view taken substantially on line 13—13 of FIGURE 11.

Referring now to the drawings and more particularly to FIGURE 1 the brake of the principal form of the present invention is indicated generally by reference numeral 10 and is shown in association with a vehicle wheel assembly 12 having a hub 14 rotatable receivable on a spindle 16 of an axle 17, and a rim 18 maintained in spaced relation to the hub 14 by a web or spider 20. The hub 14 has a radially outwardly extending flange 22 provided with a plurality of circumferentially spaced openings 24 for reception of studs 26 which pass through corresponding openings at the inner marginal edge of the web 20. The web 20 is removably secured in position by means of lug nuts 28.

The brake 10 includes an axially fixed rotatable element 11 and a non-rotatable element 13 housing circumferentially spaced friction assemblies 13a selectively movable axially into engagement with the rotatable element 11 by means of servo mechanisms 15.

The hub 14 is maintained on the spindle 16 in the radial position illustrated by means of thrust roller bearings 30 and 32. The axle 17 has a shoulder 19 against which the roller bearing 32 abuts. The hub 14 is provided with an inwardly extending annular shoulder 21 which is urged into engagement with the roller 32 by a lock-nut 23. An anchor plate 34 extends radially outwardly from the axle 17 adjacent the shoulder 19 and to this anchor plate is secured the non-rotatable element 13 which comprises a fixed housing 36 having a first section 37 and a second section 39 together defining a chamber 38 having an opening 40 through which extends the rotatable member 11 which in the present instance takes the form of an annular disc the inner periphery of which is secured by suitably spaced rivets 44 to a flange 46 extending radially outwardly from a hub 48 which is suitably keyed to the hub 14 so as to rotate therewith. The sections 37 and 39 of the housing 36 are secured each to the other by means of circumferentially spaced machine screws 54.

According to the present invention the housing 36 is so formed as to provide efficient air circulation within the chamber 38. To this end, the sections 37 and 39 are provided with a plurality of circumferentially spaced, radially outwardly extending vanes 56, as shown best in FIGURES 1 and 2. These vanes 56 extend inwardly into the chamber 38 and are joined each to the other by means of annular cores 58. A plurality of oppositely disposed turbulizer fins 60 are integrally formed with each core 58 and extend into close proximate relation to the disc 11 on each side thereof, as shown clearly in FIGURES 2, 4 and 5. The exterior surface of the housing section 37 is provided with a plurality of fins 62 which extend radially outwardly and are somewhat curved to induce a flow of secondary cooling air over a relatively large area thereof in a manner hereafter apparent. Referring now to FIGURE 2, the outer surface of the section 39 is provided with a plurality of horizontally extending vanes or fins 64 to provide maximum heat dissipation area at the inner side of the housing 36.

According to the present invention, a thorough circulation of air within the chamber 38 is effected so that the trapped air flows over a maximum area of the disc 11. To this end, a fan 66 is secured to the outer marginal edges of the disc 11 to assure movement of air radially inwardly between the several vanes 56. The air is circulated radially inwardly through the several core vanes or fins 56 and thence is directed upwardly by curved walls 68 forming a part of the housing 36. It will be noted in FIGURE 2 that the vanes 60 are oppositely disposed from the fins 56 and that the air is forced in the opposite direction between the several cores 58. Also, referring to FIGURE 8, the vanes or turbulizing fins 60 extend into close proximate relation to the surfaces of the disc 11. By this arrangement, the formation of a stagnant film or boundary layer of air at the surfaces of the disc 11 is effectively precluded.

Referring now more particularly to FIGURES 1, 2 and 6, the friction assemblies 13a are mounted in circumferentially spaced relation in the housing 36 for simultaneously engaging the rotating disc 11 when braking of the vehicle is desired. Each friction assembly 13a includes a cylindrical bore 72 formed integrally with the housing section 37 and an axially aligned cylindrical bore 72a formed integrally with the housing section 39. In each of the bores 72 and 72a is slidably mounted a piston 74 connected to a shoe 76 to the inner end of which is affixed a friction facing 78. Abutting against the piston 74 is a resilient sealing cup 80 maintained in position by a substantially frusto-conical spring 82. Suitable brake fluid may be introduced into the cylinders 72 and 72a of each friction assembly 13a by means of an inlet 73, to exert pressure against the cups 80, the pistons 74, the shoes 76, and the friction facings 78 so that the facings 78 engage the disc 11. In the present instance, fluid under pressure may be first introduced into each cylinder 72a and may flow by means of suitable passages 84 in the housing 36 to each cylinder 72.

As seen best in FIGURE 6, the facings 78 are provided with a plurality of radially extending grooves 86 to promote the circulation of air thereabout. The brake shoes 76 may be retracted to the position shown in FIGURE 6 by means of retraction assemblies 88 each of which includes an elongated stud 90 secured to its associated brake shoe, a spring retainer 92 and a compression spring 94. As each brake shoe 76 is moved towards the engaged position each of the springs 94 is compressed, and upon release of hydraulic pressure the friction facings 78 are retracted out of contact with the disc 11.

At the outer periphery of the disc 11 are a plurality of circumferentially spaced slits 98 to minimize the effect of distortion due to heat.

Referring now to FIGURES 1, 1a, 2 and 7, the fan 66 includes a radially outer shroud ring 100, secured to the periphery of the disc 11, and having arcuately outwardly extending sections 102 and 104, and a pair of radially inner shroud rings 106 maintained in the position shown by a plurality of circumferentially spaced blades 103 extending substantially perpendicularly to the plane of the disc 11. For securing the fan 66 in position, a plurality of circumferentially spaced slots 110 are formed at the outer marginal edge of the disc 11 for reception of registering tangs 112 formed integrally with the several blades 108. The blades 108 are also provided with tangs 114 for securing the inner shroud rings 106 in position, and tangs 116 passing through suitable openings in the sections 102 and 104 of the outer shroud ring 100.

As previously mentioned, the several vanes 60 are normally disposed in limited spaced relation to the surfaces of the disc 11 so as to prevent the formation of a stagnant film of air at the disc surfaces and to promote the dissipation of heat by convection into the mass of the housing sections 37 and 39 from whence the heat flows by conduction, according to the present invention, to a secondary air stream which will now be described.

A secondary air circulation assembly 120 is arranged on the outer side of the vehicle wheel. The wheel, in this instance, is formed to cooperate with the circulation assembly 120 to effect more efficient cooling of the housing 36. In particular, a series of circumferentially spaced openings 122 are formed in the web 20 adjacent the inner periphery thereof and a second series of similarly spaced openings 124 are formed in the web 20 adjacent the outer periphery thereof. Secondary air is induced to flow through the openings 122 and thence radially outwardly into contact with the housing 36 in a manner hereafter apparent.

The assembly 120 includes a wheel cover 126 having a hub portion 128 provided with a curved annular wall 130 which is spaced from the plane of the cover 126 by means of circumferentially spaced vanes 132, thus defining a plurality of openings for admission of air from the slip-stream of the vehicle.

An annular baffle 134 is secured to the inner surface of the wall 130 to direct the air into contact with the housing 36 as the air flows through the openings 122 and then through the openings 124 to be discharged through an annular opening 136 at the outer edge of the rim periphery. To promote a free flow of air in the manner described a plurality of fan blades 138 are affixed to the inner surface of the outer marginal edge of the wheel cover 126.

A vent 140 having a filter 142 is provided in the adjacent wall of the housing section 37. An annular seal 144 is mounted in abutment with the outer surface of the web 20 to assure movement of the secondary air in the manner described. Contamination of the air within the chamber 38 is prevented by a pair of O-rings 146 and a seal ring 148.

The housing 36 is desirably of cast aluminum construction to afford efficient heat conduction and light weight. Likewise, the vanes 56, the cores 58 and the turbilizer vanes or fins 60 are preferably of aluminum construction. Since the disc 11, which is preferably of sheet steel construction, is the only rotating element, the cumulative inertia is very low and dynamic balance is enhanced. Also, the areas of frictional contact are effectively cooled and yet protected from contamination. Furthermore, fading and pedal loss are eliminated by the present cooling arrangement.

In FIGURE 9 is shown a modified form of the invention in which a disc 11a, of steel or the like, is provided at each surface with a cast iron facing 149. The facings 149 provide efficient and effective wear surfaces when engaged by the several friction facings 78.

In FIGURE 2a is shown the brake of the present invention as applied to the rear wheel of a vehicle. In this instance, a hub 14a has a frusto-conical bore for reception of a similarly formed spindle 16a of an axle 17a. Since the axle 17a is a driving member, the hub 14a may be suitably keyed to the spindle 16a. The disc 11 is keyed to the hub 14a in a manner similar to that shown in FIGURE 1.

In FIGURE 10 is shown a modified form of the present invention in which like parts bear similar reference numerals. As in the form of the invention shown in FIGURE 1, the wheel assembly includes a web 20 and a rim 18. In this form of the invention, however, a brake housing 36a is provided which is rotatable with the wheel. A hub 14a is provided with a radially outwardly extending flange 22a to which is secured by means of studs 26 and lug nuts 28 in a housing section 37a to which is secured by means of circumferentially spaced machine screws 54 a housing section 39a. The lug nuts 28 retain the wheel in operative position, as in the principal form of the invention. A servo unit 15a extends into a chamber 38a formed by the housing section 37a and 39a, which are preferably of cast aluminum and are provided with impeller vanes 56a similar to the vanes 56 in the form of the invention illustrated in FIGURE 1.

The servo unit 15a includes a rotatably fixed member 150 and rotatable member 152 both of which are selectively engageable with the housing 36a to stop the vehicle, as will be hereafter apparent. Integrally formed with the member 150 is an annular cylinder 154 in which is received an annular piston 156 integrally formed with the member 152. An annular recess 160 is formed in the member 150 and a similarly formed registering recess 162 is formed in the member 152. Extending into the recess 162 is an annular shoulder 164 against which abuts flanges 166 of a retainer ring 168 which, as clearly shown in FIGURE 10, is cup-shaped in cross section. Received within the retainer 168 are a plurality of circumferentially spaced compression springs 170 which normally bias the members 150 and 152 into engagement each with the other and are held in position by an end plate 172 having a plurality of inwardly extending spaced bosses 174 for maintaining the several springs 170 in spaced relation. The plate 172 is mounted on the axial flange of hub 175 formed integrally with the member 150. A snap ring 176 retains the plate 172 in the position shown.

The member 150 moves to the left, as viewed in FIGURE 10, in response to hydraulic pressure in a manner hereafter apparent to compress the several springs 170 and to urge circumferentially spaced friction assemblies 180 into engagement with the surface of an annular cast iron facing 181 bonded to an annular core 182 which joins the several impeller vanes 56a. The springs 170 are compressed by this movement of the the member 150 and the resulting reaction tends to urge the member 150 into contact with an annular cast iron facing 183 of an annular core 186 which joins the several circumferentially spaced vanes 56a of the housing section 39a. Friction facings 190, in the present instance, are secured to circumferentially spaced flats 191 and 193 respectively in the members 152 and 150 respectively.

It will be appreciated that the directional vanes 60a are normally stationary while the impeller vanes 56a are rotating with the wheel. To promote efficient dissipation of heat from the facings 190 a plurality of radially extending grooves 195 are formed in the outer faces thereof (see FIGURE 12), and a plurality of similar grooves 197 are formed in the adjacent surface of the associated flat 191 or 193. Air is propelled in a substantially circular path at each side of the chamber 38a and flows upwardly through the several grooves 195 and 197.

The members 150 and 152 may be formed of aluminum or cast iron. In the latter instance, the friction facings 190 may be secured to the cores 182 and 196.

When the friction facings 190 of the member 152 are brought into contact with the cast iron facings 181, the member 152 starts to rotate while the member 150 remains stationary. Frictional contact of the several facings 190 is afforded by a plurality of energizing units 192, each of which includes a ball 194. At the flats 191 and 193 respectively are formed ramps 199 and 201. Upon relative movement between the members 152 and 150 each ball 194 rolls up its associated ramp 201 and relative axial movement occurs. As a result, the flats 193 are urged to the right, as viewed in FIGURE 10, to engage the associated facings 190.

The hydraulic actuating mechanism of the servo unit 15a will now be described in detail. Mounted within the cylinder 154 is an annular resilient sealing ring 194 which, as shown clearly in FIGURE 10, is cup-shaped in cross-section. Hydraulic fluid may be introduced into the cylinder 154 through a conduit 203 to urge the cup 194 to the left, as viewed in that figure, to move the annular piston 156 to the left, as previously explained. To prevent rotation of the cup 194 a ball bearing assembly 196 is positioned within the cylinder 154.

Secondary heat exchange air is circulated about the housing 36a in a manner similar to that of the principal form of the invention. In this modified form of the invention, however, the housing section 37a is provided with radially outwardly extending vanes or fins 62a which extend axially outwardly from the housing section a sufficient distance to function as a pump rotor. In this instance also air is fed from the slipstream of the vehicle and is directed radially outwardly of the wheel and discharged at the inner edge of the rim. The fins 62a present a relatively large area for effective heat exchange with the secondary air. The housing section 39a, in the modified form of the invention, is shown as provided with a plurality of radially outwardly extending fins or vanes 64a. These vanes also function as a pump rotor and induce the circulation of air from the vicinity of the axle to the inner edge of the wheel rim.

As in the principal form of the invention, heat is removed from the housing 36a by means of a secondary air circulation assembly 120a. This circulation assembly may be frictionally secured to the outer side of the vehicle wheel which is provided with series of openings 122a and 124a. The assembly 120a includes a wheel cover 126a having a hub portion 128a shown as provided with a curved annular wall 130a which is maintained in position by means of circumferentially spaced vanes 132a. Air is fed from the slipstream of the vehicle into the channels defined by the vanes 132a and is thence directed radially outwardly, in the direction of the arrows in FIGURE 10, into contact with the housing 36a. A portion of this air is expelled at the inner edge of the wheel rim. A plurality of fan blades 138a, which are affixed to the inner surface of the outer marginal edge of the wheel cover 126a, effect expulsion of a portion of this air at the outer edge of the wheel rim. An annular seal 144a cooperates with the wheel cover 126a. to prevent bypassing of the cooling air.

The brake of the modified form of the invention is characterized by rapid heat dissipation. The heat generated at the friction surfaces is quickly conducted through the several vanes 56a to the housing sections 37a and 39a, and thence to the vanes 62a and 64a. This heat is efficiently and effectively removed from the surfaces of the fins 62a and 64a by means of the secondary heat exchange air. The friction surfaces in the brake of the present invention are protected from contamination since they are enclosed within the chamber 38a. Circulation of air within the chamber 38a is afforded by rotation of the vanes 56a which propel the air between the fins or vanes 60a in the direction of the arrows in FIGURE 10 and into contact with the walls of the housing sections.

While we have described our invention in connection with certain specific constructions and arrangements it is to be understood that this is by way of illustration and not by way of limitation and the scope of our invention is defined solely by the appended claims which should be construed as broadly as the prior art will permit.

We claim:

1. A brake for a vehicle wheel comprising a rotatable element adapted to be fixed to said wheel for rotation about the axis of said wheel, a non-rotatable element operatively positioned adjacent and completely encasing said rotatable element having means for frictionally engaging said rotatable element, said non-rotatable element being particularly characterized as having a first exterior heat exchange surface extending substantially radially outwardly from said axis and a second exterior heat exchange surface extending substantially parallel to said axis, and means operatively connected to said wheel to circulate air across said first exterior heat exchange surface and across said second exterior heat exchange surface and to dissipate heat resulting from engagement of said rotatable element with said non-rotatable element.

2. A brake for a vehicle wheel comprising a radially extending rotatable disc element adapted to be fixed to said wheel for rotation about the axis of said wheel, a non-rotatable element operatively positioned about said rotatable disc element defining a chamber encompassing said rotatable disc element, engagement means connected to said non-rotatable element for frictionally engaging said rotatable disc element, said non-rotatable element being particularly characterized as having a first exterior heat exchange surface extending substantially radially outwardly from said axis and a second exterior heat exchange surface extending substantially parallel to said axis, and means operatively connected to said wheel to circulate air from a point near said axis radially outwardly across said first heat exchange surface and axially along and across said second heat exchange surface to dissipate heat resulting from engagement of said rotatable element with said non-rotatable disc element.

3. A brake adapted to be connected to a hub and a spindle of a vehicle wheel comprising a rotatable disc extending radially outwardly from said hub, a non-rotatable element including a first section and second section connected to said spindle defining a chamber surrounding said rotatable element, a rim rotatably mounted on said hub defining a first axially disposed annular passage between said rim and said non-rotatable element, a wheel cover rotatably mounted on said hub defining a second radially disposed annular passage extending from said hub and terminating in said first axially disposed annular passage between said cover and said non-rotatable element, means connected to said rotatable member and said non-rotatable member to circulate a primary heat exchange fluid within said chamber in intimate contact with said rotatable member to dissipate heat therefrom, and means to circulate a secondary heat exchange fluid through said first annular passage and through said second annular passage.

4. A brake adapted to be connected to a hub and a spindle of a vehicle wheel comprising a rotatable disc extending radially outwardly from said hub, a non-rotatable element including a first section and second section connected to said spindle defining a chamber surrounding said rotatable element, a plurality of turbulizing fins connected to said non-rotatable element within said chamber adjacent said rotatable member, a plurality of vanes connected to said non-rotatable element within said chamber, a fan connected to said rotatable element within said chamber adapted to circulate fluid across said vanes and across said turbulizing fins to dissipate heat from said rotatable element, a rim rotatably mounted on said hub defining a first annular passage between said rim and said non-rotatable element, a wheel cover rotatably mounted on said hub defining a second annular passage between said cover and said non-rotatable element, and a third annular passage between said wheel cover and said rim, a hub portion rotatably mounted on said hub, an annular wall connected to said hub portion circumferentially spaced vanes rotatably mounted on said hub for circulating fluid through said second annular passage, and fan blades operatively positioned in said third annular passage for circulating fluid through said third annular passage.

References Cited in the file of this patent

UNITED STATES PATENTS

| | | |
|---|---|---|
| 1,572,870 | Armstrong | Feb. 16, 1926 |
| 1,731,416 | Gurney | Oct. 15, 1929 |
| 2,105,867 | Stewart | Jan. 18, 1938 |
| 2,243,334 | Eksergian | May 27, 1941 |
| 2,248,684 | Levy | July 8, 1941 |
| 2,331,259 | Whitten | Oct. 5, 1943 |
| 2,642,959 | Freer | June 23, 1953 |
| 2,655,236 | Bachman | Oct. 13, 1953 |
| 2,761,530 | Dawley | Sept. 4, 1956 |

FOREIGN PATENTS

| | | |
|---|---|---|
| 918,905 | France | Nov. 12, 1946 |
| 1,031,814 | France | Mar. 25, 1953 |
| 901,870 | Germany | Jan. 14, 1954 |